United States Patent [19]

Schnell

[11] Patent Number: 5,174,612
[45] Date of Patent: Dec. 29, 1992

[54] VIBRATION ISOLATING SEALING CLAMP FOR CONDUIT STRUCTURES

[75] Inventor: Werner J. Schnell, Morton Grove, Ill.

[73] Assignee: Senior Engineering Investments, B.V., Amsterdam, Netherlands

[21] Appl. No.: 731,211

[22] Filed: Jul. 15, 1991

[51] Int. Cl.$^5$ ............................................. F16L 57/00
[52] U.S. Cl. .................................... 285/49; 285/115; 285/158; 285/414; 285/208
[58] Field of Search ................ 285/114, 115, 49, 158, 285/189, 205–209, 414

[56] References Cited

U.S. PATENT DOCUMENTS

| | | | |
|---|---|---|---|
| 1,933,749 | 11/1933 | Murray | 285/115 |
| 2,359,952 | 10/1944 | Welger | 285/414 |
| 2,422,597 | 6/1947 | Stewart | 285/116 |
| 2,580,818 | 1/1952 | Mundy et al. | 285/115 |
| 2,937,038 | 5/1960 | Gondek | 285/158 |
| 3,850,455 | 11/1974 | Stafford | 285/114 |
| 3,937,500 | 2/1976 | Sato | 285/414 |
| 4,218,078 | 8/1980 | Lee | 285/158 |
| 4,468,054 | 8/1984 | Orth | 285/208 |

FOREIGN PATENT DOCUMENTS

| | | | |
|---|---|---|---|
| 528413 | 6/1931 | Fed. Rep. of Germany | 285/114 |
| 617654 | 7/1978 | U.S.S.R. | 285/115 |
| 2069084 | 8/1981 | United Kingdom | 285/414 |

*Primary Examiner*—Eric K. Nicholson
*Attorney, Agent, or Firm*—Dick and Harris

[57] ABSTRACT

A vibration isolating clamp apparatus for maintaining an end of a tube in sealing abutment with a surface, in substantial alignment with an aperture disposed in the surface, suitable for use in extreme temperature environments, wherein the tube has an outwardly-projecting, annular bead arranged substantially adjacent the portion of the tube adjacent the aperture in the surface. A retainer member is provided with a clamp attachment region and a tube retaining region. Means for enabling affixation of the clamp apparatus to the surface are disposed in the clamp attachment region. In the tube retaining region, means are provided for insertably receiving the extreme end of the tube. Bead sealing means entrap the bead between the tube retaining region and the surface. In the tube retaining region, tube isolation means limit the magnitude of transverse vibrations of the end of the tube, proximate to and beyond the bead, and away from the extreme end of the tube.

14 Claims, 2 Drawing Sheets

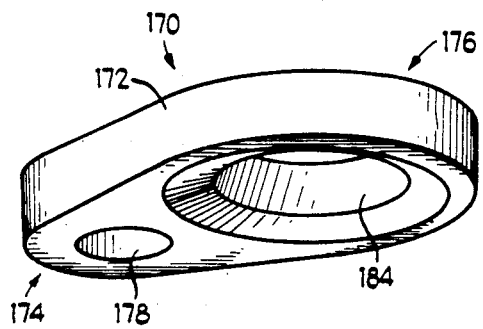
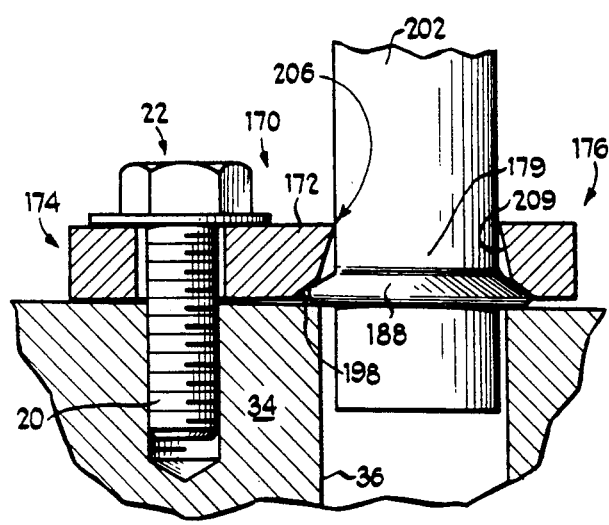
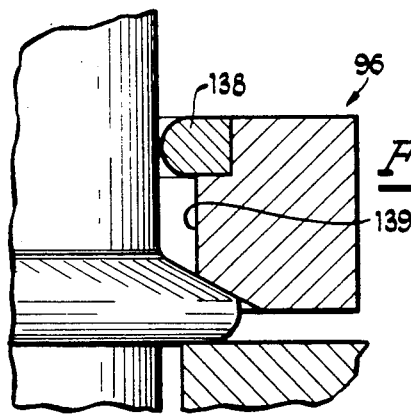
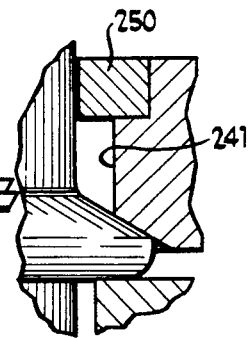
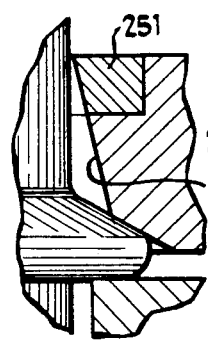
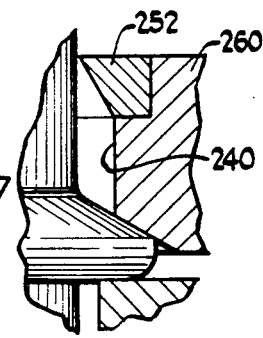

VIBRATION ISOLATING SEALING CLAMP FOR CONDUIT STRUCTURES

BACKGROUND OF THE INVENTION

The present invention relates to clamps for mounting tubes obliquely onto surfaces where the surface and the tube may be undergoing relative vibration, and particularly, to clamps for mounting tubes to components of a vehicle motor.

A modern automobile motor requires or is provided with a variety of accessory apparatus which involve the use of tubes to transmit pressurized fluid (such as exhaust) or provide a vacuum, to a portion of the motor block, carburetor, intake or exhaust manifolds, or other component. For example, an EGR (exhaust gas recirculation) tube directs hot exhaust gases from the exhaust manifold or other part of the exhaust system, to the carburetor or air intake manifold, which improves fuel efficiency and, as well, improves the quality of the vehicle's exhaust emissions.

Typically, the tube will be insertingly received at its ends directly into apertures provided in the sidewalls of the respective motor components. Each end of the tube may be provided with a outwardly extending, annular bead, to, in part, limit the extent to which the tube extends into the sidewall of the motor component, and as well to provide a surface for the clamp to bear on, to hold the tube end in place.

A typical prior art clamp used to secure a tube end would be fabricated as a simple plate-like retainer member, with a first bolt aperture in a clamp attachment region for attaching the retainer member to the sidewall. Another, second tube aperture would be provided in an opposite end of the retainer member, in tube retaining region, to receive the tube end. The diameter of the tube aperture would be large enough to receive the tube end, without binding. On the surface of the retainer member facing the sidewall, around the tube aperture, an inwardly angled chamfer would partially accommodate the bead, but the chamfer would not be so deep as to completely surround the bead. Were the bead to be completely surrounded, the tube retaining region of the retainer member would lie flat on the sidewall, taking substantially all of the pressure off of the bead, reducing the sealing force of the clamp. Instead, the chamfer only partially receives the bead, and the clamp, when installed, fits flush to the sidewall at the clamp attachment region, and is separated from the sidewall, at the tube retaining region, a short distance by the bead.

The tube end is, naturally, subjected to substantial vibration, in the environment of a vehicle motor, particularly in a mounting on or in the vicinity of the motor block. Such tubes as the EGR tube, are constructed with thin walls, to conserve weight and enhance flexibility. Vibrations, such as transverse vibrations, are felt by the tube end primarily in the areas surrounding the bead, which itself is held immobile by the clamp. Accordingly, failure of the tube end around the bead is accelerated by the vibrations of the tube away from the bead.

A possible solution, which has been considered, is to merely reduce the clearance between the inside of the tube aperture and the tube. However, due to the thin-walled nature of the tube, any slight misalignment of the tube with respect to the clamp and the aperture in the sidewall, would cause the edge of the inside of the tube aperture to bear excessively against the tube, leading to the buckling and failure of the tube. It is often desirable to permit the EGR tube, or other such tube, to be installed at a slight misalignment, to help accommodate the variations in dimensions and tolerance build-ups which may exist from vehicle to vehicle.

The provision of vibration-absorbing or dampening elastomeric elements would likewise not be an acceptable solution, as the EGR tube, and other such tubes, carry high temperature fluids or are otherwise in high temperature environments. Elastomeric materials typically cannot function, or remain solid and stable, at such temperatures over prolonged periods of time. Such elastomeric materials likewise typically do not perform well in extreme cold, in that the flexibility and resiliency of the material is reduced or eliminated.

It is an object of this invention, therefore, to provide a clamp apparatus for mounting a tube end to a sidewall of a motor or motor component, which clamp apparatus is configured to lengthen the useful lifespan of the tube by reducing the magnitude of the harmful transverse vibrations which the tube end undergoes.

It is another object of the invention to provide a clamp apparatus which is capable of effectively clamping a tube with the tube end in slight misalignment relative to the clamp apparatus or the sidewall, without potentially damaging the tube.

A further object of the invention is to provide such a clamp apparatus which is capable of functioning in extreme temperature environments.

These and other objects of the invention will become apparent in view of the present specification, claims and drawings.

SUMMARY OF THE INVENTION

The present invention is a vibration isolating clamp apparatus for maintaining an end of a tube, from which a bead outwardly projects around the circumference thereof, in substantially abutting, sealing contact with a surface. The apparatus also maintains the tube end substantially in alignment with an aperture disposed in the surface. The present invention is configured for use in substantially extreme temperature environments.

The apparatus comprises a retainer member having a clamp attachment region, a clamp retaining region and first, bottom and second, top clamp surfaces. Means for enabling affixation of the clamp apparatus to the surface are disposed in the tube attachment region. In the preferred embodiments of the invention a first bolt aperture insertably receives the shaft of a bolt which hold the clamp to the surface.

Means for insertably and operably receiving the tube end are disposed in the tube retaining region. In the preferred embodiments of the invention, a second tube aperture is positioned through the tube retaining region, from the first, bottom clamp surface to the second, top clamp surface. Around this aperture, adjacent the first, bottom clamp surface, are bead sealing means for accommodating the bead, to entrap the bead between at least a portion of the tube retaining region and the surface.

Adjacent the second, top clamp surface of the retainer member are tube isolation means, independent of the bead sealing means, for isolating and limiting the magnitude of transverse vibrations in the tube end, proximate to the bead.

The bead sealing means for accommodating the bead comprises a chamfer, disposed adjacent to and radially outward from the aperture in the retaining region, adjacent the first, bottom clamp surface. The chamfer recedes radially inwardly from the first side surface.

The tube isolation means for limiting the magnitude of transverse vibrations in the tube end comprise a radially, inwardly projecting annular ridge, arranged in the tube aperture in the tube retaining region, adjacent the second, top clamp surface. In a preferred embodiment, the annular ridge has a rectangular cross-sectional configuration, while in another preferred embodiment, the annular ridge has a substantially semicircular cross-sectional configuration. In still another embodiment, the annular ridge is an edge, at the second, top clamp surface, and the second tube aperture in the tube retaining region is configured to have continuously increasing diameter from the second, top clamp surface to the first, bottom clamp surface.

The ridge preferably has a height substantially less than the overall height of the retainer member. In particular, the annular ridge has a height less than one-third of the overall height of the retainer member. Similarly, the chamfer extends into the retainer member, a distance less than one-third of the overall height of the retainer member. A central portion of the retainer member, therefore, between the annular ridge and the chamfer, is configured so as to not contact the tube end.

In an alternative embodiment of the invention, the annular ridge is formed by an annular insert member, which is insertingly received by an annular recess surrounding the second tube aperture, near the second, top surface of the tube retaining region.

BRIEF DESCRIPTION OF THE DRAWINGS

FIG. 6A is an enlarged view of a portion of FIG. 6, showing the shape of the inward surface of the insert in greater detail.

FIG. 6B is an enlarged view of an alternative insert construction;

FIG. 6C is an enlarged view of a further alternative insert construction used in a main clamp body having a tapering tube end aperture;

FIG. 6D is an enlarged view of the alternative insert construction of FIG. 6C, used in a main clamp body having a straight sided tube end aperture;

FIG. 7 is a bottom perspective view of the vibration isolating clamp according to another preferred embodiment of the invention; and FIG. 8 is a side elevation, in section, of the vibration isolating clamp according to FIG. 7, shown mounted on a sidewall and holding a tube end.

DETAILED DESCRIPTION OF THE INVENTION

Figure 1:
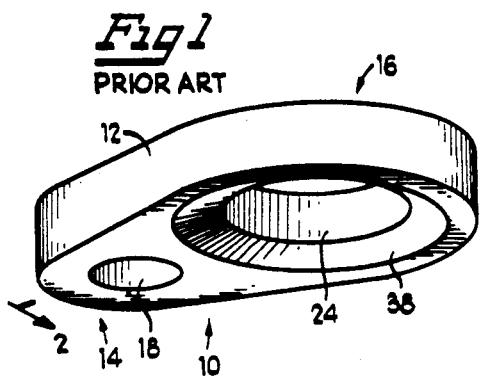
FIG. 1 is a bottom perspective view of a prior art clamp.

While this invention is susceptible of embodiment in many different forms, there is shown in the drawings and will be described in detail herein, several specific embodiments of the invention, with the understanding that the present disclosure is intended to be an exemplification of the principles of the invention and is not intended to limit the invention to the embodiments illustrated.

Figure 2:
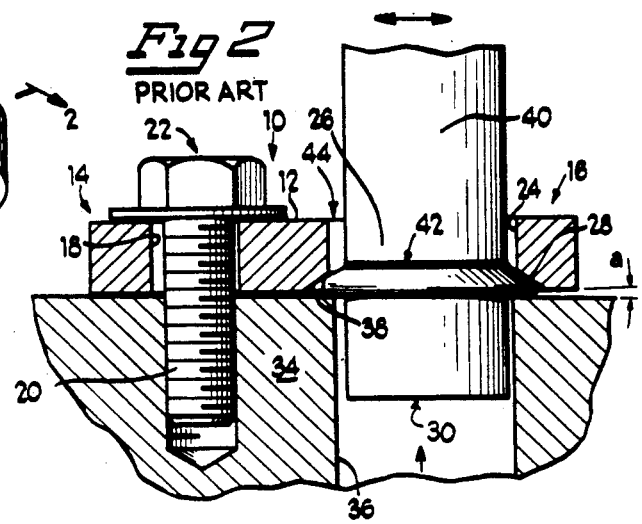
FIG. 2 is a side elevation, in section, of the prior art clamp of FIG. 1, shown mounted on a sidewall and holding a tube end.

Prior art clamp apparatus 10, shown in FIGS. 1 and 2, includes retainer member 12, which further includes clamp attachment region 14 and tube retaining region 16. Bolt aperture 18, in clamp attachment region 14, is configured to receive and pass through shaft 20 of a bolt 22. Tube aperture 24, in tube retaining region 16, is configured to readily receive tube end 26, which has bead 28 integrally formed or affixed thereto. Bead 28 extends circumferentially around, and projects outwardly from, tube end 26, and is positioned a selected distance from extreme end 30.

To facilitate assembly, tube end 26, which will ultimately form part of a complete fluid bearing tube, such as an EGR (exhaust gas recirculation) tube, is typically formed as a separate end piece which is passed through aperture 24 in the direction shown by the vertical arrow in FIG. 2. The upper portion 40 of tube end 26 may be then attached to a remaining tube portion (not shown), either before or after tube end 26 and retainer member 12 are mounted to sidewall 34 and extreme end 30 is inserted into aperture 36 in sidewall 34. Chamfer 38 may be provided to help align retainer member 12 onto tube end 26, to help hold tube end 26 securely in aperture 36, and help reduce the angle which retainer member 12 makes with sidewall 34, reducing the stresses induced in retaining member 12.

However, as indicated by the horizontal double arrow in FIG. 2, tube end 26 will be subjected to transverse vibratory motion, relative to sidewall 34, due to vibratory movement of sidewall 34, which may be part of a motor block, for example, or due to vibrations being transmitted along the remaining tube portion (not shown). Since bead 28 is held fast to sidewall 34 by retainer member 12, as the upper portion 40 of tube end 26 oscillates back and forth within the clearance, the material of tube end 26 along junction region 42 will begin to fatigue from the cyclical stresses and will ultimately fail. Reducing the size of the clearance would reduce the magnitude of the transverse vibratory motions of upper portion 40; however, in the event that tube end 26 should be slightly misaligned initially, as may sometimes be necessary to accommodate dimensional errors and tolerance build-up, the points of tube end 26 which are initially in contact with retainer member 12 would be weakened and tend to buckle prematurely as a result of vibration and contact of the retainer member against the tube end 26.

It is imperative, therefore, to prolong the life of tube end 26 by reducing the impact of transverse vibration stresses in junction region 42, without reducing the capacity of retainer member 12 to accept, fit and retain slightly misaligned tube ends 26.

Figure 3:
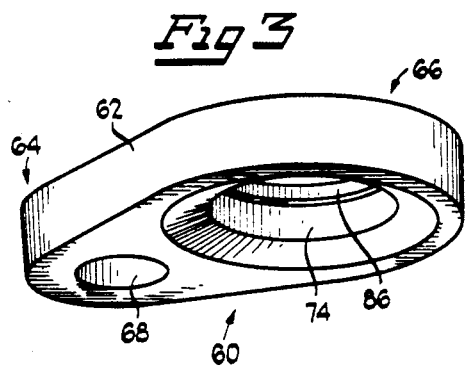
FIG. 3 is a bottom perspective view of the vibration isolating clamp according to a preferred embodiment of the invention.
Figure 4:
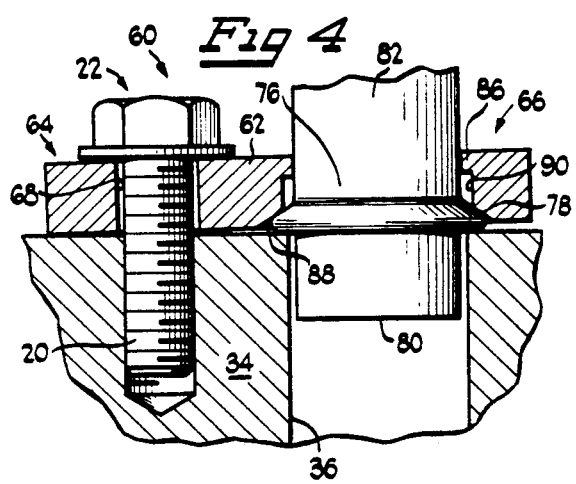
FIG. 4 is a side elevation, in section, of the vibrant in isolating clamp according to FIG. 3, shown on a sidewall and holding a tube end.

A first preferred embodiment of the invention is shown in FIGS. 3 and 4. Vibration isolating clamp 60 is likewise formed as retainer member 62 and includes clamp attachment region 64 and tube retaining region 66. Bolt aperture 68 and tube aperture 74 are positioned substantially the same as their respective counterparts in prior art clamp 10. Retainer member 62 may be attached likewise to sidewall 24 by a bolt 22. Tube end 76, provided with bead 78, is configured to be received at extreme end 80, by aperture 36 in sidewall 34. However, in order to prevent outer end 82 from undergoing destructively large amplitude transverse vibrations, the inner surface of aperture 74 has radially, inwardly projecting annular ridge 86, which, in the embodiment of FIGS. 3 and 4, is contiguously formed as an integral part of retainer member 62. Ridge 86, while reducing the amount of "play" that upper portion 82 of tube end 76 may undergo, still permits some misalignment of tube end 76 with respect to aperture 36, due to the remaining clearance area 90.

Figure 5:
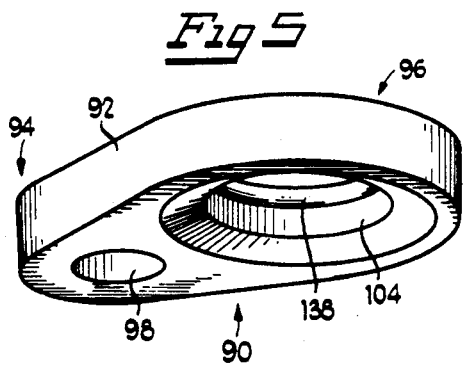
FIG. 5 is a bottom perspective view of the vibration isolating clamp according to another preferred embodiment of the invention.
Figure 6:
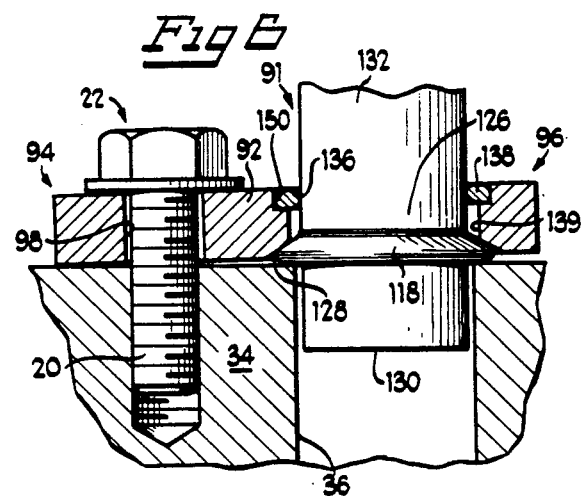
FIG. 6 is a side elevation, in section, of the vibration isolating clamp according to FIG. 5, shown mounted on a sidewall and holding a tube end.

A second preferred embodiment of the invention is shown in FIGS. 5, 6 and 6a. The function and basic structure of this second preferred embodiment is substantially the same as that in FIGS. 3 and 4, in that vibration isolating clamp 90 is a retainer member 92, having clamp attachment region 94 and tube retaining region 96 with bolt aperture 98 for bolt 22 and tube aperture 104 for receiving extreme end 130 of tube end 126. Bead 118 is retained by chamfer 128. Upper portion 132 of tube end 126, however, is restrained by radially inward projecting annular ridge 136, which is formed by insert 138, which is fabricated as a separate piece, apart from retainer member 90, and then fit into annular recess 150 and held in position by forced fit, welding or other suitable method. The inward surface of insert 138 maybe fabricated as a flat, a semi-circle (as in the embodiment), or any other suitable shape. Again, oscillation of upper portion 132 is limited, but misalignment with continued function is still possible due to the presence of clearance area 139.

In addition to the configuration shown in FIGS. 6 and 6A, the insert may have other configurations. FIG. 6B shows insert 250 having a rectangular cross-sectional configuration, used with a main clamp body having a straight sided tube end aperture 241. In FIG. 6C, clearance area 239 has a tapered contour, similar to the embodiment of FIGS. 7 and 8. Insert 251 has a trapezoidal cross-sectional configuration, with the inside surface tapering to an edge. The inside surface of insert 251 may taper at the same angle as clearance area 239, as in FIG. 6C, or it may have a lesser or greater amount of taper. In addition, tapered inset 252 may be used also with a clamp apparatus 260 wherein clearance area 240 has a straight contour as in FIG. 6D.

A third preferred embodiment of the invention is shown in FIGS. 7 and 8. Vibration isolating clamp apparatus 170 includes retainer member 172, having clamp attachment region 174 and tube retaining region 176, with bolt aperture 178 for receiving bolt 22, and tube aperture 184 for receiving tube end 179. Upper portion 202 of tube end 179 is restrained by edge 206. To provide room for misalignment of tube end 179, and to remove some of the loading from bead 188, which is entrapped by chamfer 198. In this embodiment, tube aperture 184 is formed as a conical hole, expanding in diameter from the outer side of retainer member 172, to chamfer 198, which is, in this embodiment merely a continuation of tube aperture 184, with a more rapidly increasing diameter. Clearance area 209 enables slight misalignment of tube end 179.

In each of the foregoing embodiments, it can be seen that the annular ridges are formed with a height (along the direction of the tube aperture) which is substantially less than the overall height of the respective retainer members, in particular no more than one-third of the overall height. In this way, the centrally disposed clearance areas are provided to permit some misalignment of the tube end, with the tube only being contacted by the chamfer and the annular ridge.

The foregoing constructions permit the entire clamp apparatus to be fabricated of metal, such as aluminum or steel, or specialized alloys, without reliance upon elastomeric materials, which may become brittle or stiff in extreme cold, or which much melt, disintegrate or otherwise become structurally unstable in extreme heat, as in the embodiment of an EGR tube. In the embodiments in which an insert member is used, different materials may be used for the retainer member and the insert member, to, for example, take advantage of a more resilient, wear-resistant, or "softer" material for the insert. This embodiment would also permit the use of an elastomeric material as an insert, in non-extreme temperature applications.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A vibration isolating clamp apparatus for maintaining an end of a fluid bearing tube having a longitudinal axis, in substantially sealing abutment with a surface and in substantial alignment with an aperture disposed in said surface, suitable for use in extreme temperature environments, in which said tube includes a substantially outwardly projecting annular bead positioned substantially at the portion of said tube adjacent said aperture in said surface, said vibration isolating clamp apparatus comprising:

a retainer member having a clamp attachment region, a tube retaining region, and a first, bottom clamp surface and a second, top clamp surface substantially opposite said first, bottom clamp surface;

said clamp attachment region having, operably disposed therein, means for enabling affixation of the clamp apparatus to said surface;

tube aperture means operably arranged to extend through the tube retaining region from said first, bottom clamp surface to said second, top clamp surface, said tube aperture means having a first interior diameter at a position immediately adjacent said projecting annular bead;

bead sealing means operably arranged about the tube aperture means substantially adjacent to the first, bottom clamp surface for receiving and rigidly restraining the bead, so as to entrap the bead between at least a portion of said tube retaining region and said surface; and tube isolation means, longitudinally disposed from said bead sealing means, for isolating and limiting the magnitude of transverse vibrations of said end of said tube, proximate to said bead, said tube isolation means being formed as a radially, inwardly projecting, annular metallic ridge, having a second interior diameter less than said first interior diameter of said tube aperture means, said annular ridge being arranged within the tube aperture means in a position substantially adjacent said second, top clamp surface of said retainer member, so as to impose substantially rigid limits on the magnitude of said transverse vibrations.

2. The clamp apparatus according to claim 1 wherein said means for enabling affixation of said clamp apparatus to said surface comprises:
a first bolt aperture arranged in the clamp attachment region and extending through said retainer member to insertingly receive a bolt shaft.

3. The clamp apparatus according to claim 1 wherein said bead sealing means comprises:
a chamfer, operably disposed immediately adjacent to and radially outwardly flared from the tube aperture means, and receding radially inwardly, from the first, bottom clamp surface of the retainer member.

4. The clamp apparatus according to claim 1 wherein said annular ridge has a rectangular cross-sectional configuration.

5. The clamp apparatus according to claim 1 wherein said annular ridge has a substantially convex inwardly facing surface.

6. The clamp apparatus according to claim 3 wherein said annular ridge comprises:
a radially, inwardly projecting edge, conically and operably disposed at the second, top clamp surface in the tube retaining region, such that the tube aperture means has a substantially continuously increasing diameter, from the second, top clamp surface to the chamfer.

7. The clamp apparatus according to claim 1, having an annular recess operably positioned in said tube restraining region, around said tube aperture means, substantially adjacent the second, top clamp surface and said annular ridge comprises:
an annular insert member having an internal diameter less than the diameter of said tube aperture means so as to form said annular ridge.

8. The clamp apparatus according to claim 1 wherein said annular ridge extends from said second, top clamp surface of said tube retaining region, into said retainer member, no more than one-third of the overall height of the retainer member.

9. The clamp apparatus according to claim 8 wherein said chamfer extends from said first, bottom surface of said tube retaining region, into said retainer member, no more than one-third of the overall height of the retainer member.

10. The clamp apparatus according to claim 9, wherein a control portion of said retainer member, in said tube retaining region, around said tube aperture means and between said annular ridge and said chamfer, is configured to be free from contact with said tube end, so that only said chamfer and said annular ridge contact said tube end.

11. The clamp apparatus according to claim 7, wherein said annular ridge has a rectangular cross-sectional configuration.

12. The clamp apparatus according to claim 7, wherein said annular ridge has an inwardly facing convex surface.

13. The clamp apparatus according to claim 7, wherein said annular ridge comprises:
a radially, inwardly projecting edge, conically and operably disposed at substantially the second, top clamp surface in the tube aperture means, such that the tube aperture means has a substantially continuously increasing diameter, from the second, top clamp surface to said first diameter.

14. A vibration isolating clamp apparatus for maintaining an end of a tube in substantially sealing abutment with a surface and in substantial alignment with an aperture disposed in said surface, suitable for use in extreme temperature environments, in which said tube includes a substantially outwardly projecting annular bead positioned substantially at the portion of said tube adjacent said aperture in said surface, said vibration isolating clamp apparatus comprising:
a retainer member having a clamp attachment region, a tube retaining region, and a first, bottom clamp surface and a second, top clamp surface substantially opposite said first, bottom clamp surface;
said clamp attachment region having, operably disposed therein, means for enabling affixation of the clamp apparatus to said surface;
tube aperture means operably arranged to extend through the tube retaining region from the first, bottom clamp surface to the second, top clamp surface,
bead sealing means operably arranged around the tube aperture means adjacent to the first, bottom clamp surface for receiving and restrainably accommodating the bead, so as to entrap the bead between at least a portion of said tube retaining region and said surface,
said bead sealing means being configured in the form of a chamfer, operably disposed immediately adjacent to and radially outwardly flared from the tube aperture means, and receding radially inwardly, from the first, bottom clamp surface; and
tube isolation means, independent of said bead sealing means, for isolating and limiting the magnitude of transverse vibrations of said end of said tube, proximate to said bead,
said tube isolation means being formed as a radially, inwardly projecting annular ridge, arranged within the tube aperture means, substantially adjacent the second, top clamp surface of said retainer member,
said annular ridge being formed as a radially, inwardly projecting edge, conically and operably disposed at the second, top clamp surface in the tube retaining region, such that the tube aperture means has a substantially continuously increasing diameter, from the second, top clamp surface to the chamfer.

* * * * *